(12) United States Patent
Terayama et al.

(10) Patent No.: US 8,793,634 B2
(45) Date of Patent: Jul. 29, 2014

(54) LSI DESIGN METHOD AND LSI DESIGN DEVICE

(71) Applicant: Renesas Electronics Corporation, Kanagawa (JP)

(72) Inventors: Toshiaki Terayama, Kanagawa (JP); Ryoji Ishikawa, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/944,983

(22) Filed: Jul. 18, 2013

(65) Prior Publication Data

US 2014/0047402 A1 Feb. 13, 2014

(30) Foreign Application Priority Data

Aug. 9, 2012 (JP) ................................ 2012-176874

(51) Int. Cl.
*G06F 17/50* (2006.01)
(52) U.S. Cl.
CPC ........ *G06F 17/5072* (2013.01); *G06F 17/5077* (2013.01); *G06F 17/5081* (2013.01); *G06F 17/505* (2013.01); *G06F 17/5031* (2013.01)
USPC ........... 716/114; 716/105; 716/123; 716/124; 716/129; 716/130; 716/131; 703/16
(58) Field of Classification Search
CPC ............ G06F 17/5072; G06F 17/5073; G06F 17/5081; G06F 17/505; G06F 17/5031; G06F 17/5077

USPC ......... 716/114, 105, 123, 124, 129, 130, 131; 703/16
See application file for complete search history.

(56) References Cited

U.S. PATENT DOCUMENTS

| | | | |
|---|---|---|---|
| 6,367,060 B1 * | 4/2002 | Cheng et al. ................. | 716/114 |
| 6,687,888 B2 * | 2/2004 | Chen ............................. | 716/113 |
| 6,698,006 B1 * | 2/2004 | Srinivasan et al. ............ | 716/114 |
| 6,701,506 B1 * | 3/2004 | Srinivasan et al. ............ | 716/114 |
| 6,701,507 B1 * | 3/2004 | Srinivasan .................... | 716/114 |
| 6,754,877 B1 * | 6/2004 | Srinivasan .................... | 716/114 |
| 6,910,196 B2 * | 6/2005 | Cocchini ....................... | 716/114 |
| 7,003,741 B2 * | 2/2006 | Srinivasan .................... | 716/113 |

(Continued)

FOREIGN PATENT DOCUMENTS

| | | | |
|---|---|---|---|
| JP | 2001-306642 A | 11/2001 | |
| JP | 2003-078014 A | 3/2003 | |
| JP | 2009-152451 A | 7/2009 | |

*Primary Examiner* — Phallaka Kik
(74) *Attorney, Agent, or Firm* — Mattingly & Malur, PC

(57) ABSTRACT

In an LSI design method of designing a clock tree that supplies a clock signal to a plurality of leaves from a clock supply point, when a high level clock tree is constituted by H-tree and a low level clock tree is formed by CTS, the number of stages of a high level clock tree is optimized without giving any constraint on the placement of a low level clock tree. The leaves are divided into a plurality of groups to form a low level local tree. A clock-supplied region including all leaves to be supplied with a clock is uniformly divided and for each divided region, a skew when a clock signal is supplied from an end of an H-tree to start points of a plurality of local trees included in that region is estimated. The clock-supplied region is more finely equally-divided to increase the number of stages of H-tree.

15 Claims, 7 Drawing Sheets

(56) References Cited

U.S. PATENT DOCUMENTS

| | | | |
|---|---|---|---|
| 7,127,696 B2* | 10/2006 | Alpert et al. | 716/114 |
| 7,228,517 B2* | 6/2007 | Katayose | 716/114 |
| 7,538,603 B2* | 5/2009 | Ikeda et al. | 327/565 |
| 7,795,943 B2 | 9/2010 | Toyonoh et al. | |
| 8,205,182 B1* | 6/2012 | Zlatanovici et al. | 716/125 |
| 2003/0177459 A1* | 9/2003 | Chen | 716/5 |
| 2004/0210857 A1* | 10/2004 | Srinivasan | 716/2 |
| 2005/0097491 A1* | 5/2005 | Katayose | 716/10 |
| 2005/0138578 A1* | 6/2005 | Alpert et al. | 716/2 |
| 2007/0285179 A1* | 12/2007 | Ikeda et al. | 331/56 |
| 2012/0299627 A1* | 11/2012 | Taskin et al. | 327/141 |

\* cited by examiner

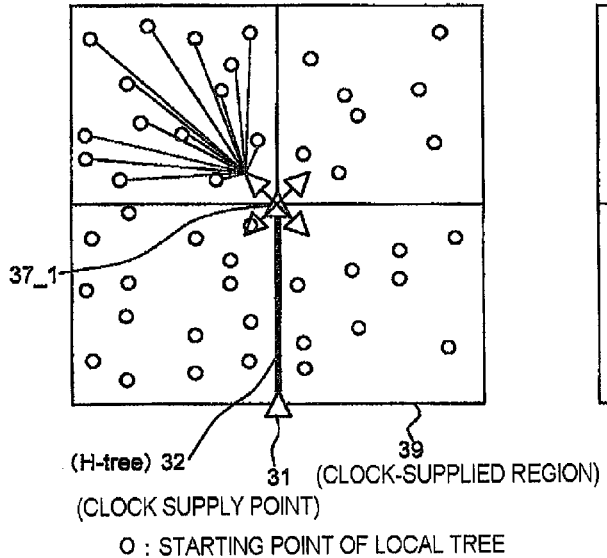
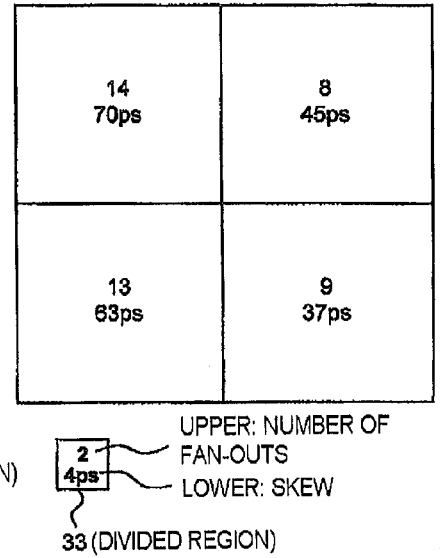
FIG. 3A LAYOUT
FIG. 3B ANALYSIS RESULT BY TOOL
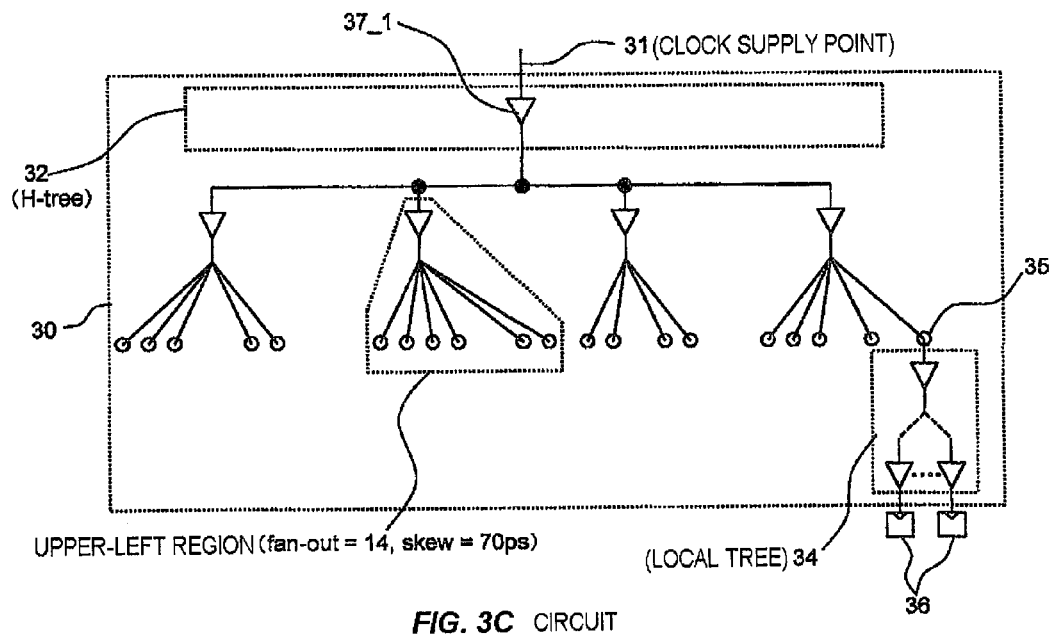
FIG. 3C CIRCUIT

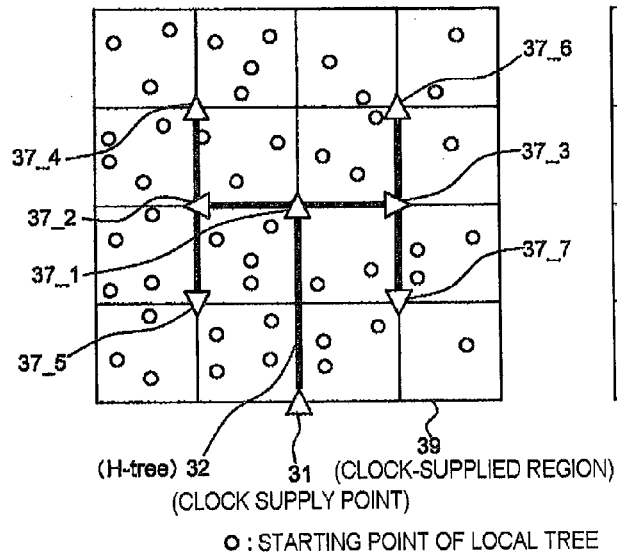
*FIG. 4A* LAYOUT  *FIG. 4B* ANALYSIS RESULT BY TOOL
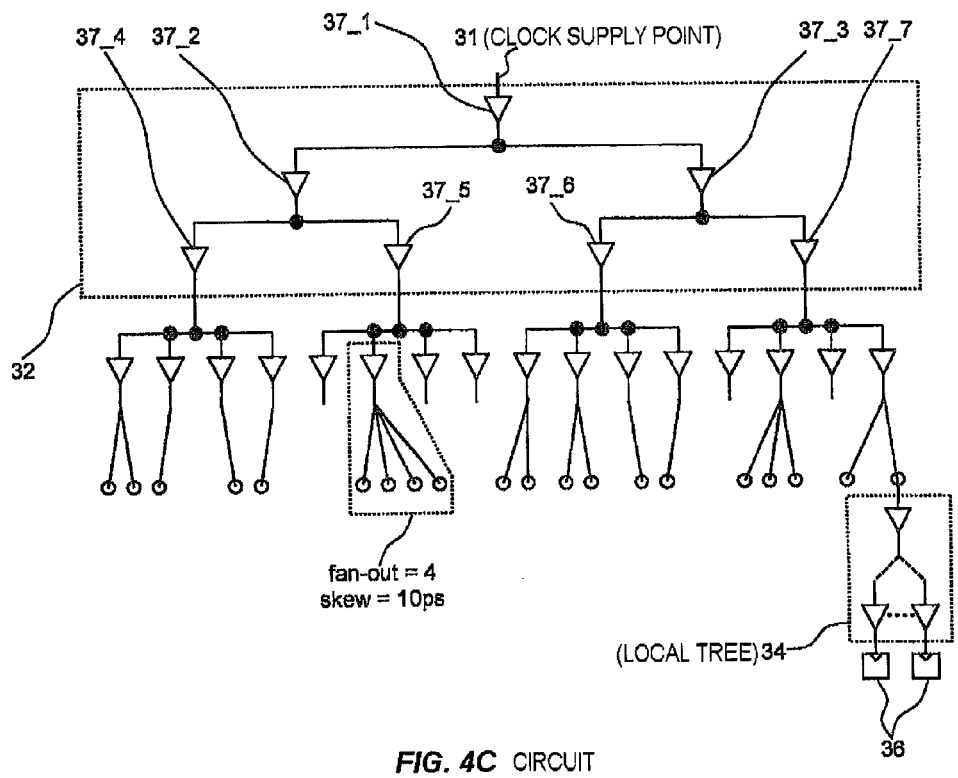
*FIG. 4C* CIRCUIT

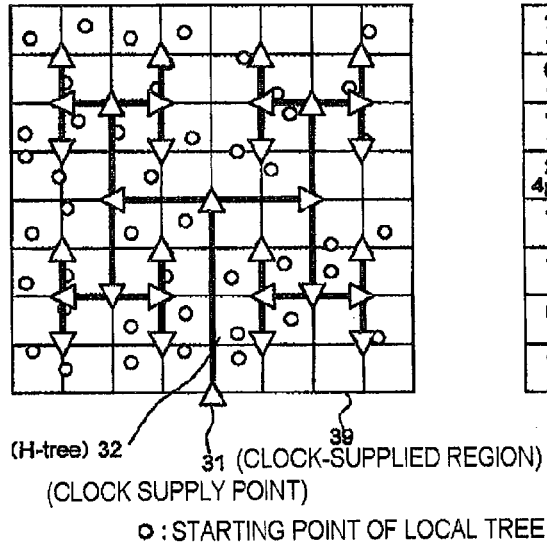
(H-tree) 32  31 (CLOCK-SUPPLIED REGION)
(CLOCK SUPPLY POINT)
| 2 4ps | — UPPER: NUMBER OF FAN-OUTS
— LOWER: SKEW
○ : STARTING POINT OF LOCAL TREE   33 (DIVIDED REGION)
FIG. 5A LAYOUT          FIG. 5B ANALYSIS RESULT BY TOOL
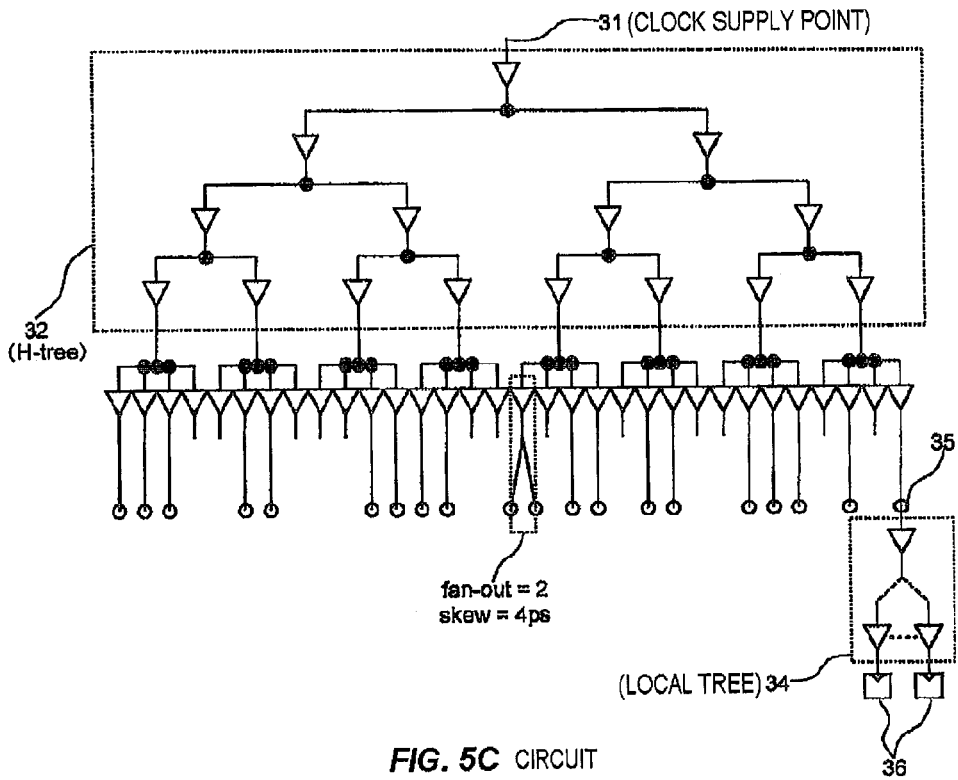
fan-out = 2
skew = 4ps
(LOCAL TREE) 34
FIG. 5C CIRCUIT

LSI DESIGN METHOD AND LSI DESIGN DEVICE

CROSS-REFERENCE TO RELATED APPLICATION

The disclosure of Japanese Patent Application No. 2012-176874 filed on Aug. 9, 2012 including the specification, drawings and abstract is incorporated herein by reference in its entirety.

BACKGROUND

The present invention relates to a method and a device for designing a clock tree that distributes a clock signal in designing an LSI, and can be suitably used in designing a clock tree with low power consumption in particular.

CTS (Clock Tree Synthesis), which automatically generates a clock tree that distributes a clock signal from a clock supply point to leaves in designing an LSI (Large Scale Integrated circuit), tends to insert a large number of clock buffers in order to reduce a clock skew. This causes an increase in power consumption of the LSI.

CTS is a bottom-up clock tree design method of placing clock buffers to a clock supply point in a tree shape, with a large number of leaves at the ends of a clock tree as start points. More details are as follows, for example. Flip-flops and the like at the ends (leaves) of a clock tree are divided into groups, each of which is constituted by a plurality of leaves, and each group is driven with one clock buffer. A plurality of clock buffers each driving each group is divided into groups, and the respective groups are driven with one high level clock buffer. This is repeated until the number of highest level clock buffers becomes the number of clock buffers that can be driven by a clock supply point. The propagation delay of a clock signal from a clock supply point to a leaf is referred to as a latency, and a difference between the latencies is referred to as a clock skew. Although the clock skew is ideally zero, an allowable maximum value of the clock skew is given as a skew constraint. If the skew constraint cannot be satisfied, a clock buffer for increasing the latency is inserted into a path with a smaller latency of a clock tree to reduce the skew and thereby satisfy the skew constraint.

The method of forming a clock tree described in Japanese Patent Laid-Open No. 2009-152451 (Patent Document 1) is CTS that generates a clock tree from bottom up by grouping loads as uniformly as possible. For a clock buffer leading to a clock gate in a tree, the placement thereof is determined based on a distribution of clock gates (Paragraph 0034), and the number of stages is uniformly set (Paragraph 0018), and the number of stages of a clock buffer from a clock gate to a leaf is also uniformly set (Paragraph 0021), thereby suppressing the clock skew.

According to a gated clock synthesis method described in Japanese Patent Laid-Open No. 2001-306642 (Patent Document 2), fan-outs of a gated buffer are divided into the optimum number of groups based on a specified maximum number of fan-outs, and a gated logic and a gated buffer are inserted for each group, thereby suppressing the clock skew.

In CTS, as disclosed in Patent Document 1 and Patent Document 2, the fan-out of a clock buffer is attempted to be equalized, thereby suppressing the clock skew. However, because leaves are not always uniformly distributed within an LSI chip, a variation may occur in the routing length of a routing constituting a clock tree. The clock skew increases due to a variation in the routing length.

In contrast, there is a clock tree generation method, called H-tree, of generating a clock tree under a constraint that the driving from a clock buffer to the next stage clock buffer is performed with an equal load/equal-length routing. The H-tree is a top-down clock tree design method of sequentially placing buffers in a tree shape toward leaves with a clock supply point as a start point. An LSI chip is equally divided into two by a straight line passing through a clock supply point to form two regions, and the same clock buffer of the next stage is placed at the center of the respective regions. At the respective centers of the two regions, the distance from the clock supply point is set equal to each other and the size of the clock buffer is set to the same size, thereby placing the clock buffers having an equal load and an equal driving power, respectively. Because the routing load (resistance and capacitance) from the clock supply point to the first-stage buffer is equal and further the load of the buffer itself (input capacitance) is also equal, the signal propagation delay from the clock supply point to the first-stage buffer is theoretically equal to each other. That is, the clock skew becomes theoretically zero. Each region is further equally divided into two, and the same clock buffer of the next stage is placed at the respective centers. By repeating this, the constraint of the equal load/equal-length routing is maintained and the clock skew can be theoretically suppressed to zero. An LSI chip is sequentially equally-divided into two, four, eight equal regions, but in cases where leaves are not uniformly placed, a variation in fan-outs occurs in coupling to leaves and a clock skew is generated.

In Japanese Patent Laid-Open No. 2003-078014 (Patent Document 3), an upper stage with a clock supply point as a start point is constituted by H-tree, while a lower stage is formed by CTS. By restricting the placement position so that a clock driver generated by CTS is placed only within a certain region, coupling between an end of the H-tree and the start point of the CTS is simplified (Paragraph 0021, etc.).

SUMMARY

In CTS, as disclosed in Patent Document 1 and Patent Document 2, a clock buffer is added for the purpose of reducing the clock skew and for the purpose of equalizing the load, and therefore the power consumption of an LSI increases due to the added clock buffer. On the other hand, even if all the clock trees are formed down to a leaf at the end by H-tree, the power consumption of an LSI would increase instead. This is because if clock trees are formed down to a leaf at the end by H-tree, a total number of stages of H-tree are determined by the number of stages of a clock buffer to a region where the leaves are the densest, and therefore the number of clock buffers constituting H-tree more than necessary are placed in a region where the leaves are sparse.

As disclosed in Patent Document 3, an upper stage with a clock supply point as a start point is constituted by H-tree and a lower stage is formed by CTS, thereby a clock tree can be optimally configured in order to reduce the power consumption consumed by a clock buffer.

However, a specific design method has not been proposed yet for optimizing the number of stages of a high level clock tree in a clock tree, in which an upper stage with a clock supply point as a start point is constituted by a clock tree, such as H-tree, with an equal length/equal load and a lower stage is coupled to a clock tree formed by dividing leaves into a plurality of groups using CTS or the like. In Patent Document 3, by restricting the placement position so as to place a clock driver, which is generated and placed by CTS, within a certain region, the coupling between an end of H-tree and a start point of CTS is simplified (Paragraph 0021, etc.). Because leaves are not necessarily placed equally spreading across the whole chip, it is not preferable to restrict the placement position of a clock driver generated by CTS.

While the means for solving the above-described problems are described below, the other problems and the new feature will become clear from the description of the present specification and the accompanying drawings.

According to one embodiment, the followings are provided.

That is, there is provided an LSI design method of designing a clock tree that supplies a clock signal from a clock supply point to the leaves placed in a circuit region. The method includes the following steps.

The leaves are divided into a plurality of groups, a local tree is formed for the each of the divided groups and thereby a plurality of local trees is generated. A clock-supplied region including a circuit region is uniformly divided, and a step of placing a clock buffer with an equal load through an equal-length routing with a clock supply point as a start point is repeated, so that one clock buffer for each divided region is placed by repeating the steps above. A skew is estimated when a clock signal is supplied from a clock buffer placed for each divided region to start points of the local trees included in that region.

Until the estimated skew satisfies a predetermined skew constraint, the clock-supplied region is more finely equally-divided, and the clock buffer with the equal load is placed through an equal-length routing, the skew, when a clock signal is supplied to the start points of the local trees included in that region, is estimated, and determining whether the estimated skew satisfies the predetermined skew constraint or not is repeated.

The following explains briefly the effect acquired by the above-described embodiment.

That is, the upper stage with the clock supply point as the start point is constituted by the clock tree with the equal length/equal load, and this is then coupled to a local clock tree of a lower stage formed by dividing leaves into the groups. In this resulting clock tree, the number of stages of the high level clock tree can be optimized.

BRIEF DESCRIPTION OF THE DRAWINGS

FIGS. 3A to 3C are explanatory views showing an intermediate step (at a time when a clock-supplied region has been divided into four) of the processing in the Second Embodiment;

FIGS. 4A to 4C are explanatory views showing an intermediate step (at a time when a clock-supplied region has been divided into 16) of the processing in the Second Embodiment;

FIGS. 5A to 5C are explanatory views showing an intermediate step (at a time when a clock-supplied region has been divided into 64) of the processing in the Second Embodiment;

DETAILED DESCRIPTION

1. Overview of an Embodiment

Figure 1:
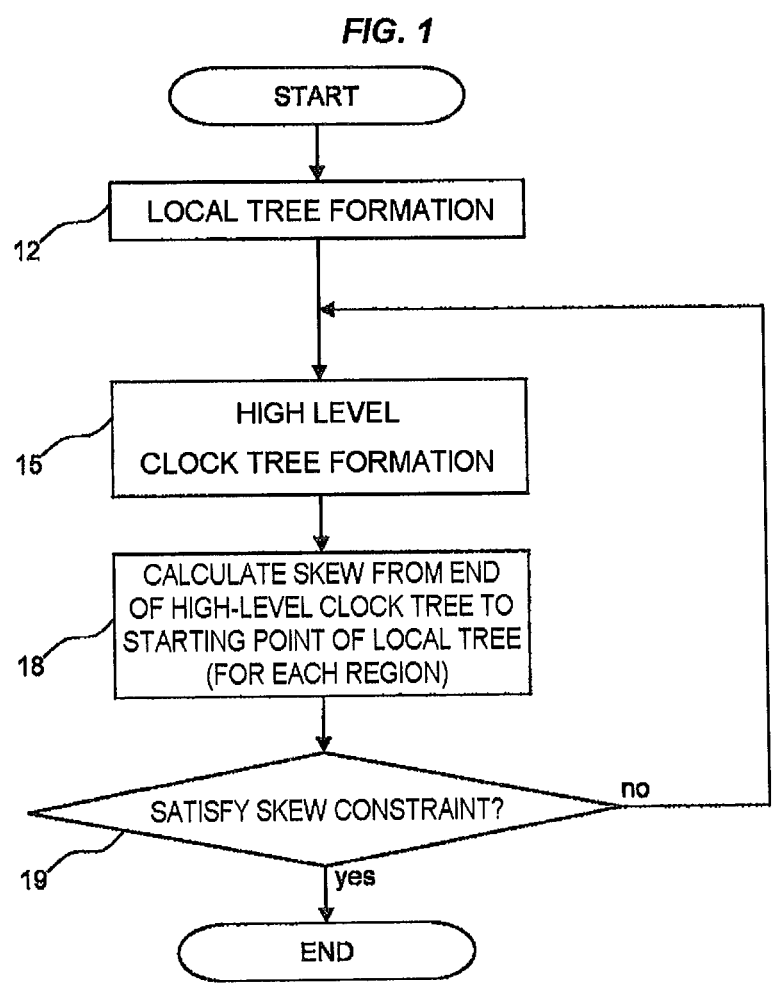
FIG. 1 is a flow chart representing the processing in a First Embodiment.

First, an overview of a typical embodiment disclosed in the present application is described. In the overview description of the typical embodiment, a reference numeral referred to with parentheses in the accompanying drawings simply illustrates the one included in the concept of a component with the reference numeral attached thereto.

[1] <Method of Optimizing Number of Stages of High Level H-Tree of H-Tree+CTS>

An LSI design method, on a computer, of designing a clock tree (30) for supplying a clock signal from a clock supply point (31) to a plurality of leaves (36) on an LSI chip includes the each of steps as follows.

A first step for dividing the leaves into a plurality of groups and forming a local tree in each of the divided groups to generate a plurality of local trees.

A second step (step 15) for forming a high level clock tree by repeating a step of uniformly dividing a clock-supplied region (step 13) and a step of placing a low level clock buffer (37) with an equal load through an approximately equal-length routing from a high level clock buffer, with the clock supply point as a start point, and placing one clock buffer for each of the divided regions (step 14).

A third step (Step 18) for calculating, for each of the divided regions, a skew of a path for supplying a clock signal from an end of the high level clock tree to each of start points (35) of the two or more local trees included in the divided region.

A fourth step (Step 19) for determining whether or not the skew calculated for each of the divided regions satisfies a predetermined skew constraint.

The LSI design method further includes a loop (loop step), in which the divided region is further uniformly-divided until the skew constraint is satisfied in all the divided regions, the number of stages of the high level clock tree is increased by further placing one clock buffer for the each further divided region, and subsequently the third step and the fourth step are carried out.

Thus, an upper stage with a clock supply point as a start point is constituted by a clock tree with an equal length/equal load, and this is then coupled to a local clock tree of a lower stage formed by dividing leaves into the groups. In this resulting clock tree, the number of stages of the high level clock tree can be optimized.

[2] <Item [1]+Fan-Out Constraint>

The method in Item [1] above further includes: a fifth step (Step 16) of counting, for each of the divided regions, the number of start points of the local tree included in the divided region; and a sixth step (Step 17) of determining whether or not the number of start points of the local tree calculated for each of the divided regions satisfies a predetermined fan-out constraint.

In the loop, the divided region is further uniformly-divided until the fan-out constraint and the skew constraint are satisfied in all the divided regions, the number of stages of the high level clock tree is increased by further placing one clock buffer for the each further divided region, and subsequently the fifth step and the sixth step and/or the third step and the fourth step are carried out.

Thus, the fan-out constraint can be satisfied in each region, and for example, the occurrence of violation of an electrical-characteristic rule, such as a specification related to a signal transition time, can be prevented.

[3] <Skew Library>

In Item [2], a skew library (22) is provided, in which for each assumed size of the divided region, a relationship between the magnitude of a skew and the number of fan-outs is calculated in advance, and in the third step, the skew is calculated for each of the divided regions based on the number of start points of the local tree, using the skew library.

Thus, the calculation of a skew in the third step can be speeded up.

[4] <Power Consumption Estimated by Clock Tree>

In Item [1], the power consumption is estimated by the clock tree, as follows.

The skew library (22) is provided, in which for each assumed size of the divided region, a relationship between the magnitude of a skew and the number of fan-outs is calculated in advance, and further the following each step is included.

A seventh step (Step 25) for performing logic synthesis with respect to a high level description net list to generate a gate level net list (24).

An eighth step (Step 26) for performing floor planning based on the gate level net list.

A fifth step (Step 16) for counting, for the each divided region, the number of start points of the local tree included in the divided region.

A sixth step (Step 17) for determining whether or not the number of start points of the local tree calculated for each of the divided regions satisfies a predetermined fan-out constraint.

A ninth step (Step 20) for estimating the power consumption consumed by a clock tree.

In the first step, the local trees are formed, with the leaves included in the gate level net list as a target.

In the fifth step, assume that for each of the divided regions the start points of the local tree are dispersed at a predetermined density, then the number of start points of the local tree included in the divided region is calculated for each of the divided regions.

In the third step, the skew is calculated using the library, based on the number of the start points of the local tree that is calculated with the assumption that, for each of the divided regions the start points of the local tree are dispersed at a predetermined density.

In the loop, the divided region is further uniformly-divided until the fan-out constraint and the skew constraint are satisfied in all the divided regions, the number of stages of the high level clock tree is increased by further placing one clock buffer for the each further divided region. Subsequently the fifth step and the sixth step and/or the third step and the fourth step are carried out.

In the ninth step, the number of stages of the high level clock tree at a time when the fan-out constraint and the skew constraint are satisfied in all the regions divided in the loop is calculated. Based on the number of stages of the high level clock tree and on the number of the leaves included in the gate level net list, the power consumption by the clock tree is estimated.

Thus, in a phase prior to performing placement & routing, a prototype of a clock tree can be created at high speed, and the power consumption by the clock tree can be estimated.

[5] <Estimation with the Assumption that Local Trees are Uniformly Dispersed>

In Item [4], in the fifth step, with the assumption that the start points of the local trees are uniformly dispersed for each of the divided regions, the number of start points of the local tree included in the divided region is calculated for each of the divided regions.

Thus, the calculation time for estimation can be reduced.

[6] <LSI Design Device Capable of Optimizing Number of Stages of High-Level H-Tree of H-Tree+CTS>

An LSI design device capable of generating the clock tree (30), which supplies a clock signal from the clock supply point (31) to the leaves, with respect to a net list including the leaves (36) includes the respective units as follows.

A local tree generation unit (12) capable of generating a plurality of local trees by dividing the leaves into a plurality of groups and forming the local tree (34) in each of the divided groups.

A high level clock tree generation unit (15) capable of: uniformly dividing the clock-supplied region (39) (Step 13); placing the low level clock buffer (37) with an equal load through an approximately equal-length routing from a high level clock buffer, with the clock supply point as a start point (Step 14); and repeating the above Step 13 and Step 14 to place one clock buffer for each of the divided regions (33), thereby forming a high level clock tree.

A skew calculation unit (18) capable of calculating, for each of the divided regions, a skew of a path for supplying a clock signal from an end of the high level clock tree to each of the start points (35) of the two or more local trees included in the divided region.

A skew constraint determination unit (19) capable of determining whether or not the skew calculated for each of the divided regions satisfies a predetermined skew constraint.

The LSI design device further uniformly divides the divided region until the skew constraint is satisfied in the all divided regions, and increases the number of stages of the high level clock tree by further placing one clock buffer for the each further divided region. The LSI design device can subsequently execute a loop process for performing the processing of the skew calculation unit and the skew constraint determination unit.

Thus, an upper stage with a clock supply point as a start point is constituted by a clock tree with an equal length/equal load, and a local clock tree of a lower stage is formed by dividing leaves into the groups. An LSI design device can be provided, capable of generating a clock tree, the number of stages of a high level clock tree of which is optimized in the clock tree configured by coupling the upper stage to the lower stage.

[7] <Item [6]+Fan-Out Constraint>

In Item [6], the LSI design device further includes: a fan-out count unit (16) capable of counting, for each of the divided regions, the number of start points of the local tree included in the divided region; and a fan-out constraint determination unit (17) capable of determining whether or not the number of start points of the local tree calculated for each of the divided regions satisfies a predetermined fan-out constraint.

In the loop process, the divided region is further uniformly-divided until the fan-out constraint and the skew constraint are satisfied in all the divided regions, and the number of stages of the high level clock tree is increased by further placing one clock buffer for the each further divided region. Subsequently, the processing of the fan-out count unit and the fan-out constraint determination unit and/or the processing of the skew calculation unit and the skew constraint determination unit can be performed.

Thus, the fan-out constraint can be satisfied in each region, and for example, violation of an electrical-characteristic rule, such as a specification related to a signal transition time, can be prevented.

[8] <Skew Library>

In Item [7], the LSI design device includes the skew library (22), in which for each assumed size of the divided region, a relationship between the magnitude of the skew and the number of the fan-outs is calculated and stored in advance, and the skew calculation unit is constituted to be capable of executing, using the skew library, the process of calculating the skew for each of the divided regions based on the number of start points of the local tree.

Thus, the calculation of the skew in the skew calculation unit can be speeded up.

[9] <Estimation of Power Consumption Consumed by Clock Tree>

In Item [6], the LSI design device can estimate the power consumption consumed by the clock tree as follows.

The LSI design device includes the skew library (22), in which for each assumed size of the divided region, a relationship between the magnitude of the skew and the number of the fan-outs is calculated and stored in advance, and further includes the respective units as follows.

Included: a logic synthesis processing unit (25) capable of performing logic synthesis with respect to a high level description net list to generate a gate level net list (24); a floor plan processing unit (26) capable of performing floor planning based on the gate level net list; a fan-out count unit (16) capable of counting, for each of the divided regions, the number of start points of the local tree included in the divided region; a fan-out constraint determination unit (17) capable of determining whether or not the number of start points of the local tree calculated for each of the divided regions satisfies a predetermined fan-out constraint; and a clock estimation processing unit (20) capable of estimating the power consumption consumed by a clock tree.

The local tree generation unit can form the local trees, with the leaves included in the gate level net list as a target.

The fan-out count unit can calculate, for each of the divided regions, the number of start points of the local tree included in the divided region with the assumption that for each of the divided regions the start points of the local tree are dispersed at a predetermined density.

The skew calculation unit can, using the library, calculate the skew based on the number of the start points of the local tree that is calculated with the assumption that for each of the divided regions the start points of the local tree are dispersed at a predetermined density.

In the loop process, the high level clock tree generation unit further uniformly-divides the divided region until the fan-out constraint and the skew constraint are satisfied in all the divided regions, and increases the number of stages of the high level clock tree by further placing one clock buffer for the each further divided region. Subsequently, the processing of the fan-out count unit and the fan-out constraint determination unit and/or the processing of the skew calculation unit and the skew constraint determination unit can be performed.

The clock estimation processing unit can calculate the number of stages of the high level clock tree at a time when the fan-out constraint and the skew constraint are satisfied in all the regions divided in the loop process, and can perform the processing of calculating the power consumption consumed by the clock tree based on the number of stages of the high level clock tree and on the number of the leaves included in the gate level net list.

Thus, an LSI design device can be provided, capable of, in a phase prior to performing placement & routing, preparing a prototype of a clock tree at high speed and estimating the power consumption consumed by the clock tree.

[10] <Estimation with the Assumption that Local Trees are Uniformly Dispersed>

In Item [9], the fan-out count unit can perform the processing of calculating, for each of the divided regions, the number of start points of the local tree included in the divided region with the assumption that for each of the divided regions the start points of the local trees are uniformly dispersed.

Thus, the calculation time for estimation can be reduced.

2. Details of Embodiments

Embodiments will be described further in detail.

First Embodiment

FIG. 1 is a flow chart representing the processing in a First Embodiment. Although not limited in particular, an LSI design method shown in the flow chart of FIG. 1 can be performed using a computer, or an LSI design device capable of performing the LSI design method shown by the flow chart of FIG. 1 can be configured.

A gate net list of a circuit formed in an LSI chip is input. The gate net list includes a logic circuit mainly constituted by a standard cell. The gate net list may further include a memory and others such as an analog macro. The gate net list includes a plurality of leaves, to which a clock signal is supplied from a clock supply point in the LSI chip. The examples of the leaves include clock synchronous circuits, such as a memory, an A/D converter, and a D-A converter, as well as a flip-flop and a latch. A logical gate for gating a clock may be also regarded as one type of leaf. This is because in the clock gate, timing constraints on setup and hold may be imposed between a signal for controlling gating and a clock.

The gate net list can be synthesized from a net list, which is described in a high level logic, such as a behavior level or RTL (Register Transfer Level), by a logic synthesis tool, for example. The gate net list at a time when it is synthesized does not include a clock tree, and clock routings to all the leaves are formed directly from a clock supply point or via a gating cell. The routings at this time point are simply for associating a clock supply point and a leaf, and do not satisfy an electric design rule, such as a fan-out constraint, and the like.

In the processing in the First Embodiment, initially, all the leaves included in the gate net list and coupled to the same clock system are divided into a plurality of groups and a local tree is formed in each of the divided groups, thereby generating a plurality of local trees (Step 12). The local tree can be generated by a well-known CTS, for example. The generation of a local tree (Step 12) is from bottom up when a clock supply point is referred to as an upstream. In generating this local tree (Step 12), constraints on a fan-out, a skew, a latency and the like may be given.

When leaves are divided into a plurality of groups, it is preferable to divide so that a sum of loads of leaves included in each group with respect to a clock signal becomes generally equal. In other words, it is preferable to divide so that a latency, which is the propagation delay of a clock signal from a start point of a local tree to a leaf, becomes equal among a plurality of local trees. Moreover, the skew is preferably minimized among the leaves within the local tree. As described later, this is because the skew theoretically becomes zero in a high level clock tree and therefore if the skew within the local tree and the skew among the local trees are minimized, the entire skew can be suppressed.

When leaves are divided into the groups, it is also preferable to divide so that the leaves placed in proximity fall in the same group. This is because a clock routing can be prevented from being lengthened and the occurrence of a skew due to a routing delay can be suppressed. In order to select leaves that are to be placed in proximity, the step (Step 11) of placing cells with respect to the gate net list can be performed prior to forming the local tree (Step 12). On the other hand, even if the placing process is not actually performed, it is possible to group so that the leaves, which are most likely to be placed in proximity with each other, are selectively included in the same group. This is because leaves through the same clock gating tend to be placed in proximity, and moreover the leaves more likely to be placed in proximity with each other can be selected by leaves not through the clock gating, based on the association between input/output signals.

Next, a high level clock tree is formed (Step 15). For the high level clock tree, a clock-supplied region including a circuit region is defined and is uniformly divided (Step 13) and a clock buffer with an equal load through an equal-length routing, with a clock supply point as a start point, is placed (Step 14) and these Step 13 and Step 14 are repeated until the high level clock tree satisfies a predetermined initial number of stages. The dividing of a clock-supplied region and the placing of a clock buffer do not actually need to be repeated, and a high level clock tree may be formed by placing, for each uniformly divided region, one clock buffer with an equal load/equal-length routing. Here, being equal for an equal length and an equal load does not have a requirement for strictly being equal, but simply represents a technical idea of setting as equal as possible. In the case of not being equal, a skew occurs accordingly.

High level clock tree formation can be realized by a clock tree forming method using the well-known H-tree, for example. A circuit region does not necessarily have a symmetric shape. The clock-supplied region is preferably square or rectangular because uniformly dividing is repeated. The clock-supplied region may encompass a circuit region, and may include the region of a memory macro or an analog macro where a leaf is not placed. As the processing (Step 15) of forming a high level clock tree operates so as to uniformly place a clock buffer of H-tree in a clock-supplied region, a clock buffer is attempted to be placed also in such a region. However, as there is no leaf to be supplied with a clock, placing of a clock buffer is wasteful. Such an operation that stops the placing of a clock buffer while keeping the symmetry of H-tree can be realized by a well-known technique related to H-tree.

For each divided region, a skew from the end of the high level clock tree formed in Step 15 to the start point of a local tree included in that region, i.e., to the input terminal of the first-stage of the clock buffer forming a local tree, is calculated (Step 18). By actually performing CTS from the end of the high level clock tree to the start point of the local tree, the skew can be calculated accurately. On the other hand, the skew can be also estimated based on the fan-out and on the distance to the start point of the local tree. Here, the skew is a difference between the maximum value and the minimum value of the propagation delay (latency) of a clock signal from the end of a high level clock tree to the respective start points of a plurality of local trees. Therefore, if the number of start points of a local tree within a divided region is one or zero, the skew cannot be calculated.

Next, it is determined whether or not the skew calculated for each divided region satisfies a predetermined skew constraint (Step 19). If the skew satisfies the predetermined skew constraint in all the regions, then in each region, the routing from the end of the high level clock tree to the start points of the local trees is performed and the flow is complete. The routing from the end of the high level clock tree to the start points of the local trees may comply with the routing method that was assumed in calculating a skew in Step 18, and the routing may be made by a clock tree using CTS as required. If the number of the start points of the local tree within the divided region is one or zero, the skew is not calculated in Step 18, but in this region the skew can be handled as satisfying the skew constraint.

If the skew does not satisfy the predetermined skew constraint in at least one region, then the flow returns to Step 15, where the divided region is more finely uniformly-divided, and in each region a clock buffer with an equal load is placed through an equal-length routing, with the point, which was the end of the high level clock tree, as a start point. Thus, the number of stages of the high level clock tree is increased. Subsequently, Step 18 and Step 19 are performed again. This loop is repeated until the skew calculated for each divided region satisfies the predetermined skew constraint in all the regions.

Thus, in a clock tree formed by coupling an upper stage, with a clock supply point as a start point, which is constituted by a clock tree with an equal length/equal load, to a local clock tree of a lower stage that is formed by dividing leaves into a plurality of groups, the number of stages of the high level clock tree can be optimized. This is because the number of stages of the high level clock tree converges to the necessary minimum number of stages in order to satisfy the predetermined skew constraint.

Second Embodiment

Figure 2:
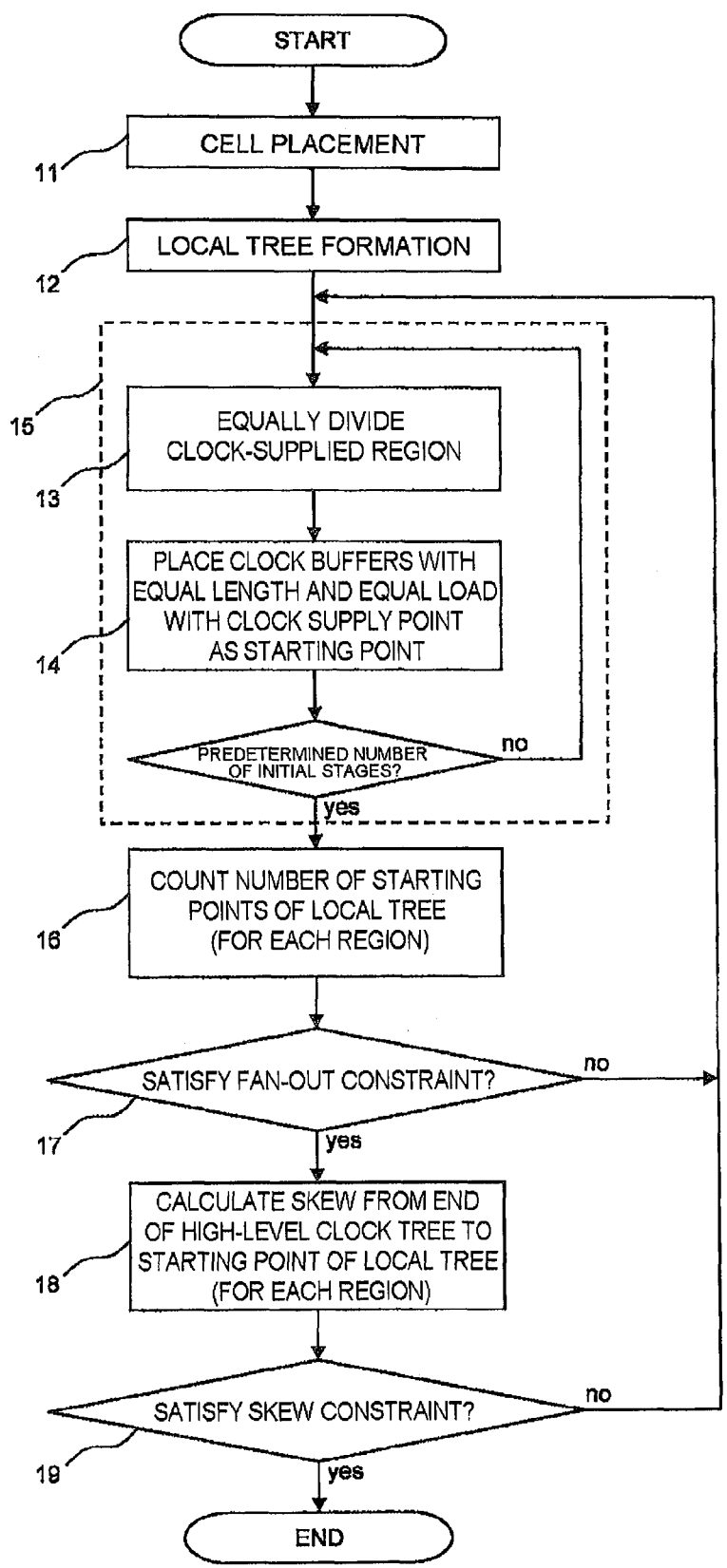
FIG. 2 is a flow chart representing the processing in a Second Embodiment.

FIG. 2 is a flow chart representing processing in a Second Embodiment. Although not limited in particular, an LSI design method shown in the flow chart of FIG. 2, as with the First Embodiment, can be performed using a computer, or an LSI design device capable of performing the LSI design method shown by the flow chart of FIG. 2 can be configured.

Cells are placed based on a gate net list (Step 11). As described above, as a clock tree has not been formed yet in the gate net list at this time point, the cell placement is not the final one. The placed leaves are divided into a plurality of groups, and a local tree is formed for each group (Step 12). As the method of grouping leaves and the local tree formation (Step 12) are the same as those of the First Embodiment, the detailed description thereof is omitted.

Next, a high level clock tree is formed (Step 15). For the high level clock tree, a clock-supplied region including a circuit region is defined and is uniformly divided (Step 13), a clock buffer with an equal load through an equal-length routing, with a clock supply point as a start point, is placed (Step 14) and these Step 13 and Step 14 are repeated until the high level clock tree satisfies a predetermined initial number of stages. The dividing of the clock-supplied region and the placing of the clock buffer do not actually need to be repeated, and the high level clock tree may be formed by placing, for each uniformly divided region, one clock buffer with the equal load/equal-length routing. This can be realized by a clock tree forming method using the well-known H-tree, for example.

FIGS. 3A to 3C, FIGS. 4A to 4C and FIGS. 5A to 5C are the explanatory views each representing an intermediate step of the processing in the Second Embodiment. They represent a time point when a clock-supplied region is equally divided into 4, a time point when equally divided into 16, and a time point when equally divided into 64, respectively. In each of FIGS. 3A to 3C, FIGS. 4A to 4C, and FIGS. 5A to 5C, A is a schematic diagram representing a layout, B is a view representing an analysis (described later) result obtained by a tool in each divided region, where an upper row indicates the number of fan-outs and a lower row indicates a skew. C is a schematic diagram representing a circuit of a clock tree from a clock supply point 31 to a plurality of leaves 36.

In the circuit of the clock tree C at a time point when cell placement (Step 11) is performed, although the illustration is omitted, the clock supply point 31 and the leaves 36 are coupled directly or through a clock gate. This is just for logically specifying a clock signal that should be supplied for each leaf, but the electrical characteristics are not taken into consideration. By Step 12, a plurality of local trees 34 are formed and the start points 35 of the local trees are defined. The start point 35 of the local tree is an input terminal of the first-stage buffer of the local tree. When the first stage is a clock gate, the start point 35 of the local tree is the clock input terminal thereof.

As shown in FIGS. 3A to 3C, a clock-supplied region 39 is equally divided into four and the first-stage clock buffer of H-tree is placed at the center. From this clock buffer, a clock signal is supplied to the local trees 34 in each of the four divided regions. By the respective steps as follows, it is determined whether the clock supply satisfies an electrical characteristic and also whether the number of stages of the high level clock tree (H-tree) needs to be increased.

In Step 16, the number of start points 35 of a local tree is counted for each divided region 33. As shown in the upper row in FIG. 3B, the number of start points 35 of the local tree of each region is counted as the number of fan-outs. The number of start points 35 of the local tree of each region corresponds to the number of fan-outs when one clock buffer is placed in that region, the one clock buffer supplying a clock signal. In Step 17, it is determined whether or not the number of start points 35 of the local tree counted in each region satisfies a predetermined fan-out constraint. If the predetermined fan-out constraint is satisfied in all the regions, then the flow proceeds to Step 18, while if there is even one region where the predetermined fan-out constraint cannot be satisfied, then the flow returns to Step 13.

In Step 18, for each divided region, a skew from the end of the high level clock tree formed in Step 15 to the start point of the local tree included in that region, i.e., to the input terminal of the first-stage of the clock buffer forming the local tree, is calculated. The detail of the method of calculating the skew is as described in detail in the First Embodiment. As shown in the lower row in FIG. 3B, the value of the skew of each region is calculated. In Step 19, it is determined whether or not the skew calculated in each region satisfies a predetermined skew constraint. If the predetermined fan-out constraint is satisfied in all the regions, then the flow of FIG. 2 is complete, while if there is even one region where the predetermined fan-out constraint cannot be satisfied, then the flow returns to Step 13.

Upon returning to Step 13, the clock-supplied region 39 is more finely uniformly-divided. The number of stages of the high level clock tree is increased by placing one clock buffer for each more finely divided region. FIGS. 4A to 4C are one example of this, where as shown in FIG. 4A the clock-supplied region 39 is further equally divided into four (Step 13) and clock buffers 37_4, 37_5, 37_6, and 37_7 are placed with an equal length/equal load (Step 14). This corresponds to increasing the number of stages of a high level clock tree by two, as shown in FIG. 4C. If an appropriate number of fan-outs of the clock buffer 37_1 is equal to or greater than four, then the placing of the clock buffers 37_2 and 37_3 may be omitted.

In the finely divided region, the number of start points of the local tree is counted again (Step 16), and it is determined whether or not the fan-out constraint is satisfied (Step 17). If the fan-out constraint is satisfied in all the regions, then in the finely divided region, a skew is calculated again (Step 18), and it is determined whether or not the skew constraint is satisfied (Step 19).

The skew calculation (Step 18) does not need to be performed until the fan-out constraint is satisfied. On the other hand, if the fan-out constraint is satisfied, then Step 16 and Step 17 may be omitted. The reason why the fan-out constraint will never be unsatisfied again is that a region is divided only in the direction where the region is more finely divided.

FIG. 4B illustrates the number of fan-outs and an analysis result of a skew. As a result of dividing the clock-supplied region 39 further into four, the number of fan-outs has decreased to approximately one fourth as compared with the case of FIGS. 3A to 3C. When this satisfies the fan-out constraint, skew calculation is performed and it is determined whether or not the skew constraint is satisfied. At this point, the maximum value of fan-outs is four and the maximum value of the skew is 10 ps. Here, assuming that both the fan-out constraint and the skew constraint are satisfied, then the entire skew, for each divided region, is a sum of a skew in a local tree and a skew as the result of the above-described analysis.

On the other hand, assuming that the fan-out constraint or the skew constraint cannot be satisfied in any one of the regions even at this time point, then for example, as shown in FIGS. 5A to 5C, the clock-supplied region 39 is more finely uniformly-divided to increase the number of stages of the high level clock. As a result, as illustrated in FIG. 5B, the number of fan-outs and the analysis result of a skew are updated. As the number of fan-outs decreases to approximately one fourth as compared with the case of FIGS. 4A to 4C, the number of fan-outs becomes one or zero in almost all regions. In the case of fan out=0 or 1, the skew is neither defined nor calculated.

In the case of fan out=0, clock buffers not required for H-tree will be included, but such buffers can be reduced using a well-known technique of reducing the number of unnecessary buffers without damaging the symmetry of H-tree. However, in the case where the high level clock tree is constituted by H-tree, if the number of stages increases by one, then the number of constituting clock buffers will approximately double. This is because the number of clock buffers constituting an N stage of H-tree becomes $2^{N-1}$. The increase in the number of clock buffers leads to an increase in the power consumption in the clock tree.

Given a fan-out constraint and a skew constraint, the number of stages of the high level clock can be set to the necessary minimum number of stages satisfying these constraints. Moreover, the fan-out constraint can be satisfied in each region, and for example, violation of an electrical-characteristic rule, such as a specification related to a signal transition time, can be prevented.

Third Embodiment

Figure 6:
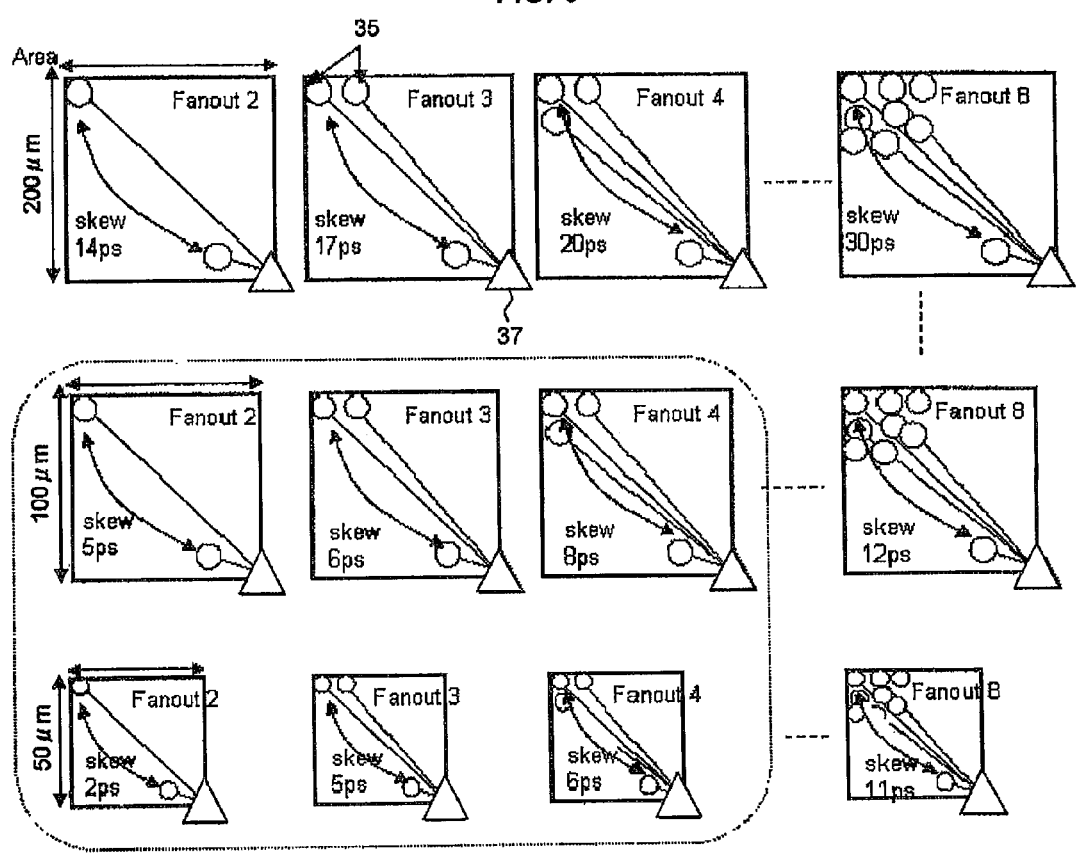
FIG. 6 is an explanatory view of the processing using a skew library in a Third Embodiment.

FIG. 6 is an explanatory view of the processing using a skew library in a Third Embodiment.

The calculation of a skew from an end of a high level clock tree to a start point of a local tree in Step 18 can be precisely conducted by assuming the actual clock buffer and the like as described in detail in the First Embodiment, but alternatively the skew can be also calculated at high speed using a skew library as shown in FIG. 6.

The skew library includes a value of a skew that is calculated in advance, based on a size of a divided region and the number of start points (the number of fan-outs) of a local tree included in this region, assuming a case where the skew becomes the maximum. FIG. 6 shows a case where the upper the row, the larger the size of a divided region becomes; and a case where the further rightward the row, the larger the number of start points (number of fan-outs) of a local tree becomes. As a skew is a difference in latency, the maximum value thereof can be calculated from a difference between latency to a start point of a local tree whose distance from an end of a high level clock tree is the closest and latency to a start point of a local tree whose distance is the farthest. In a case of fan out=2, i.e., in the case where there are two start points of a local tree within a divided region, assuming that a clock buffer at an end of H-tree is lower right, then the skew becomes the maximum value when there is a start point of the closest local tree at the same lower right and there is a start point of the farthest local tree at the upper left. The larger the size of a divided region, the larger the maximum value of a skew becomes, and therefore in FIG. 6, the skew is 2 ps when the size is 50 µm square; 5 ps when it is 100 µm square; and 14 ps when it is 200 µm square. When a size of a divided region is the same, the larger the number of start points (number of fan-outs) of a local tree, the larger the maximum value of a skew becomes. In the case of fan out is two, the value of the skew becomes the maximum when there are a start point of a local tree at the lower right closest to a clock buffer at the end of H-tree and a start point of the local tree at the upper left farthest from the clock buffer at the end of H-tree; while when the third onward start points of the local tree concentrate on the upper left farthest from the clock buffer at the end of H-tree, the value of the skew becomes the maximum. This is because although the latency of the closer one will not increase the latency of the farther one, i.e., the latency of which is large, becomes larger since the number of fan-outs increases. FIG. 6 shows an example, in which when the size of the region is 50 µm squares, skew=2 ps when fan out=2, and the skew increases as follows: skew=5 ps, 6 ps, . . . 11 ps when fan out=3, 4, . . . 8.

As described above, on the other hand, if an assumed skew is calculated in advance and stored in the skew library, then in Step 18, the skew can be calculated at high speed simply by referring to this skew library.

Thus, the skew calculation (Step 18) can be speeded up.

However, the value of a skew stored in the skew library is the maximum value when a certain size of an area and a certain number of fan-outs are assumed. Accordingly, the skew acts in the direction where the determination of whether or not a skew constraint is satisfied (Step 19) becomes severe. If this is too severe, a skew constraint given may be relaxed or the value of a skew stored into the skew library may be changed to a value calculated based on a more realistic model.

Fourth Embodiment

Figure 7:
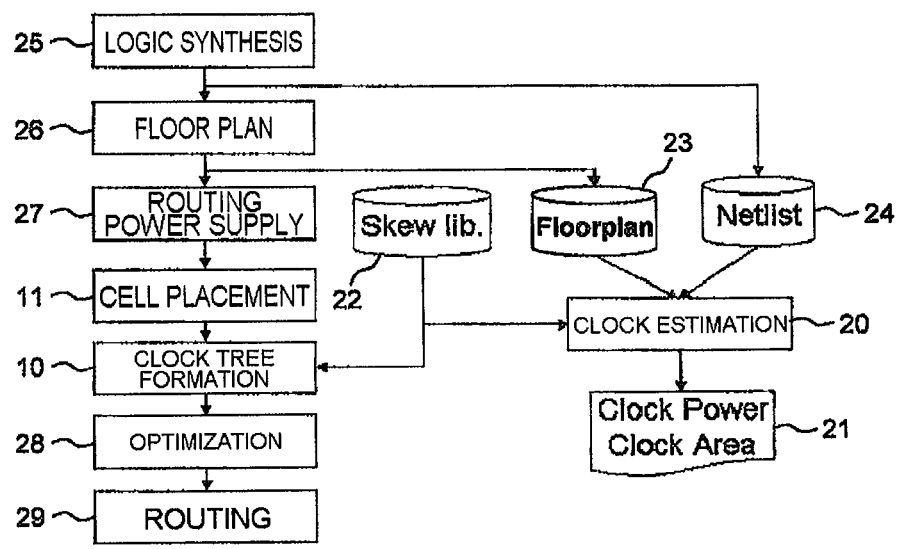
FIG. 7 is a flow chart representing the processing in a Fourth Embodiment.

FIG. 7 is a flow chart representing the processing in a Fourth Embodiment. There are provided: an LSI design method of preparing a prototype of a clock tree at high speed and estimating the power consumption and the area consumed by the clock tree, in a phase prior to placing & routing in designing an LSI; and an LSI design device using the same. Although not limited in particular, the LSI design method shown in the flow chart of FIG. 7, as with the First and Second Embodiments, can be performed using a computer, or an LSI design device capable of performing the LSI design method shown by the flow chart of FIG. 7 can be configured.

Logic synthesis (Step 25) outputs a gate net list 24 based on a net list described in a high level logic, such as a behavior level or an RTL (Register Transfer Level). Floor plan (Step 26) produces a floor plan 23 of the layout design of a chip using the gate net list 24. In an ordinary LSI design, subsequently, each step of routing power supply (Step 27), cell placement (Step 11), clock tree formation (Step 10), optimization (Step 28), and routing (Step 29) is sequentially performed to complete the design of an LSI chip.

In the present Fourth Embodiment, in a phase prior to performing placement & routing, clock estimation (Step 20) is performed to calculate the estimated values 21 of the power consumption and area consumed by a clock tree. The clock estimation (Step 20) can be realized by a flow similar to the flow chart shown in FIG. 1, or by a flow similar to a flow obtained by omitting Step 11 from the flow chart shown in FIG. 2.

The shape and area of a circuit to be supplied with a clock are given by the floor plan 23. As with the description made in the First Embodiment, the clock-supplied region 39 encompassing this circuit is defined. The number of leaves to be supplied with a clock can be calculated using the gate net list 24. These leaves to be supplied with a clock are divided into an adequate number of groups to form a local tree (Step 12). While the clock-supplied region 39 is uniformly divided (Step 13), a high level clock tree is formed (Step 15). As a specific numerical value of the area of the clock-supplied region 39 is given by the floor plan 23, a specific numerical value is given for the area of the divided region. However, as the actual cell placement (Step 11) has not been performed yet, in Step 16 of counting the number of start points of a local tree in each region, the number is calculated assuming that a local tree is uniformly dispersing across the clock-supplied region 39. Based on this, the determination of whether or not the fan-out constraint is satisfied is made (Step 17). As the number of start points of a local tree that are actually omnipresent is assumed to be uniformly dispersed, an error occurs in a direction where the fan-out constraint is relaxed. By setting a fan-out constraint given to Step 17 to a value severer than a value obtained after undergoing the actual cell placement (Step 11), this error can be compensated or reduced. The step (Step 18) of calculating a skew from an end of a high level clock tree to a start point of a local tree is also performed with assuming that the start points of the local tree are uniformly dispersing across the clock-supplied region 39, and it is determined whether or not the skew constraint is satisfied (Step 19). By the loop, in which the step of increasing the number of stages of a high level clock tree is repeated until the fan-out constraint and the skew constraint are satisfied, the number of stages of the optimum high level clock tree can be calculated. Based on the number of clock buffers forming a local tree, which was formed in Step 12, and the number of clock buffers constituting a high level clock tree, the power consumption and area consumed by the clock tree are calculated.

Thus, in a phase prior to performing placement & routing, a prototype of a clock tree can be provided at high speed and the power consumption and area consumed by a clock tree can be estimated. The rate of the power consumption by a clock tree to the power consumption of the entire LSI is extremely high, and therefore when the former power consumption does not satisfy a required specification, it can be assumed that the specification of the power consumption as the entire LSI can be hardly satisfied. Accordingly, by performing the clock estimation of the present embodiment, when there is a possibility that the specification cannot be satisfied, this possibility can be recognized in an early phase of design and a countermeasure, such as reconsidering the logic design of an LSI, can be instantaneously taken.

The skew library 22 described in the Third Embodiment can be also utilized in Step 18 in the clock estimation (Step 20). Thus, the calculation time for estimation can be reduced.

On the other hand, prior to forming a local tree (Step 12), by temporarily performing the placement of cells including at least a leaf based on a gate net list, the number of start points of a local tree for each divided region can be more accurately estimated, and therefore the power consumption by the clock tree can be more accurately estimated.

Hereinabove, the invention made by the present inventors has been specifically described based on the embodiments, but the present invention is not limited thereto, and various modifications can be made without departing from the scope of the invention.

For example, the example has been described in which the high level clock tree is constituted by the so-called H-tree. However, a clock tree capable of theoretically suppressing the occurrence of a skew to zero by placing clock buffers with an equal load in a tree shape through equal-length routing could be similarly implemented. The clock tree does not need to be in the shape of H.

In an LSI including a plurality of clock systems, the above-described embodiments may be applied sequentially or simultaneously and in parallel with respect to the respective clock systems.

Each embodiment described above can be used in combination with other LSI design method and can be incorporated into other LSI design device.

What is claimed is:

1. An LSI design method of designing a clock tree that supplies a clock signal from a clock supply point in an LSI chip to a plurality of leaves, the method comprising using a computer to perform the steps of:
    a first step for dividing the leaves into a plurality of groups and forming a local tree in each of the divided groups to generate a plurality of local trees;
    a second step for forming a high level clock tree by repeating a step of uniformly dividing a clock-supplied region and a step of placing a low level clock buffer with an equal load through an approximately equal-length routing from a high level clock buffer, with the clock supply point as a start point, and placing one clock buffer for each of the divided regions;
    a third step for calculating, for each of the divided regions, a skew of a path for supplying a clock signal from an end of the high level clock tree to each of start points of the two or more local trees included in the divided region; and
    a fourth step for determining whether or not the skew calculated for each of the divided regions satisfies a predetermined skew constraint, and the LSI design method further comprising:
    a loop, in which the divided region is further uniformly-divided until the skew constraint is satisfied in all the divided regions, where a number of stages of the high level clock tree is increased by further placing one clock buffer for each further divided region, and subsequently the third step and the fourth step are carried out.

2. The LSI design method according to claim 1, further comprising using a computer to perform the steps of:
    a fifth step for counting, for each of the divided regions, a number of start points of the local tree included in the divided region; and
    a sixth step for determining whether or not the number of start points of the local tree calculated for each of the divided regions satisfies a predetermined fan-out constraint, and the LSI design method further comprising the loop includes a loop, in which the divided region is further uniformly-divided until the fan-out constraint and the skew constraint are satisfied in all the divided regions, the number of stages of the high level clock tree is increased by further placing one clock buffer for each further divided region, and subsequently the fifth step and the sixth step and/or the third step and the fourth step are carried out.

3. The LSI design method according to claim 2,
    wherein a skew library, in which for each assumed size of the divided region, a relationship between a magnitude of a skew and a number of fan-outs is calculated in advance, is provided,
    wherein the third step calculates the skew for each of the divided regions based on the number of start points of the local tree, using the skew library.

4. The LSI design method according to claim 1,
    wherein a library, in which for each assumed size of the divided region, a relationship between a magnitude of a skew and a number of fan-outs is calculated in advance, is provided, the LSI design method further comprising using a computer to perform the steps of:
    a seventh step for performing logic synthesis with respect to a high level description net list to generate a gate level net list;
    an eighth step for performing floor planning based on the gate level net list;
    a fifth step for counting, for each of the divided regions, a number of start points of the local tree included in the divided region;
    a sixth step for determining whether or not the number of start points of the local tree calculated for each of the divided regions satisfies a predetermined fan-out constraint; and
    a ninth step for estimating a power consumption consumed by a clock tree,
    wherein the first step forms the local trees with a plurality of leaves included in the gate level net list as a target,
    the fifth step calculates, for each of the divided regions, the number of start points of the local tree included in the divided region with an assumption that for each of the divided regions the start points of the local tree are dispersed at a predetermined density,
    the third step calculates the skew using the library based on the number of the start points of the local tree that is calculated with the assumption that for each of the divided regions the start points of the local tree are dispersed at a predetermined density,
    the loop, in which the divided region is further uniformly-divided until the fan-out constraint and the skew constraint are satisfied in all the divided regions, the number of stages of the high level clock tree is increased by further placing one clock buffer for each further divided region, and subsequently the fifth step and the sixth step and/or the third step and the fourth step are carried out, and
    the ninth step calculates the number of stages of the high level clock tree, at a time when the fan-out constraint and the skew constraint are satisfied in all the regions divided in the loop, and based on the number of stages of the high level clock tree and on the number of the leaves included in the gate level net list, estimates a power consumption consumed by the clock tree.

5. The LSI design method according to claim 4,
    wherein the fifth step calculates, for each of the divided regions, the number of start points of the local tree included in the divided region with an assumption that for each of the divided regions the start points of the local trees are uniformly dispersed.

6. An LSI design device for generating a clock tree which supplies a clock signal, with respect to a net list including a plurality of leaves, from a clock supply point to the plurality of leaves, the LSI design device comprising:

a local tree generation unit for generating a plurality of local trees by dividing the plurality of leaves into a plurality of groups and forming a local tree in each of the divided groups;

a high level clock tree unit for forming a high level clock tree by repeating a step of uniformly dividing a clock-supplied region and a step of placing a low level clock buffer with an equal load through an approximately equal-length routing from a high level clock buffer, with the clock supply point as a start point, and placing one clock buffer for each of the divided regions;

a skew calculation unit for calculating, for each of the divided regions, a skew of a path for supplying a clock signal from an end of the high level clock tree to each of start points of the two or more local trees included in the divided region; and a skew constraint determination unit for determining whether or not the skew calculated for each of the divided regions satisfies a predetermined skew constraint, wherein a loop process is performed, in which the divided region is further uniformly-divided until the skew constraint is satisfied in all the divided regions, and a number of stages of the high level clock tree is increased by further placing one clock buffer for each further divided region, and subsequently processing of the skew calculation unit and processing of the skew constraint determination unit are performed.

7. The LSI design device according to claim 6, further comprising:

a fan-out count unit for counting, for each of the divided regions, the number of start points of the local tree included in the divided region; and a fan-out constraint determination unit for determining whether or not the number of start points of the local tree calculated for each of the divided regions satisfies a predetermined fan-out constraint, wherein in the loop process, the divided region is further uniformly-divided until the fan-out constraint and the skew constraint are satisfied in all the divided regions, and a number of stages of the high level clock tree is increased by further placing one clock buffer for each further divided region, and subsequently, processing of the fan-out count unit and the fan-out constraint determination unit and/or processing of the skew calculation unit and the skew constraint determination unit are executed.

8. The LSI design device according to claim 7, further comprising:

a skew library, in which for each assumed size of the divided region, a relationship between a magnitude of a skew and a number of fan-outs is calculated and stored in advance, wherein the skew calculation unit executes, using the skew library, the process of calculating the skew for each of the divided regions based on the number of start points of the local tree.

9. The LSI design device according to claim 6, further comprising:

a skew library, in which for each assumed size of the divided region, a relationship between a magnitude of a skew and a number of fan-outs is calculated in advance is provided;

a logic synthesis processing unit for performing logic synthesis with respect to a high level description net list to generate a gate level net list;

a floor plan processing unit for performing floor planning based on the gate level net list and defining the clock-supplied region;

a fan-out count unit for counting, for each of the divided regions, a number of start points of the local tree included in the divided region;

a fan-out constraint determination unit for determining whether or not the number of start points of the local tree calculated for each of the divided regions satisfies a predetermined fan-out constraint; and a clock estimation processing unit for estimating a power consumption consumed by a clock tree, wherein the local tree generation unit forms the plurality of local trees, with a plurality of leaves included in the gate level net list as a target, the fan-out count unit calculates, for each of the divided regions, the number of start points of the local tree included in the divided region with an assumption that for each of the divided regions the start points of the local tree are dispersed at a predetermined density, the skew calculation unit calculates the skew based on the number of the start points of the local tree that is calculated with the assumption that for each of the divided regions the start points of the local tree are dispersed at a predetermined density, in the loop process, the divided region is further uniformly-divided until the fan-out constraint and the skew constraint are satisfied in all the divided regions, the number of stages of the high level clock tree is increased by further placing one clock buffer for each further divided region, and subsequently, processing of the fan-out count unit and the fan-out constraint determination unit and/or processing of the skew calculation unit and the skew constraint determination unit are executed, and the clock estimation processing unit calculates the number of stages of the high level clock tree at a time when the fan-out constraint and the skew constraint are satisfied in all the regions divided in the loop process, and performs the processing of calculating a power consumption consumed by the clock tree based on the number of stages of the high level clock tree and on the number of the leaves included in the gate level net list.

10. The LSI design device according to claim 9, wherein the fan-out count unit executes processing of calculating, for each of the divided regions, the number of start points of the local tree included in the divided region with an assumption that for each of the divided regions the start points of the local trees are uniformly dispersed.

11. An LSI design method of designing a clock tree that supplies a clock signal from a clock supply point in an LSI chip to a plurality of leaves, the method comprising using a computer to perform the steps of:

a first step for dividing the leaves into a plurality of groups and forming a local tree in each of the divided groups to generate a plurality of local trees;

a second step for forming a high level clock tree by repeating a step of uniformly dividing a clock-supplied region and a step of placing a low level clock buffer with an equal load through an approximately equal-length routing from a high level clock buffer, with the clock supply point as a start point, and placing one clock buffer for each of the divided regions;

a third step for calculating, for each of the divided regions, a skew of a path for supplying a clock signal from an end of the high level clock tree to each of start points of the two or more local trees included in the divided region; and a fourth step for determining whether or not the skew calculated for each of the divided regions satisfies a predetermined skew constraint, wherein the divided region is further uniformly-divided, a number of stages of the high level clock tree is increased by further placing one clock buffer for each further divided region, and the third step and the fourth step are carried out in a loop until the skew constraint is satisfied in all the divided regions.

12. The LSI design method according to claim 11, further comprising using a computer to perform the steps of:

a fifth step for counting, for each of the divided regions, a number of start points of the local tree included in the divided region; and a sixth step for determining whether or not the number of start points of the local tree calculated for each of the divided regions satisfies a predetermined fan-out constraint, wherein the fifth step and the sixth step and/or the third step and the fourth step are carried out in the loop until the fan-out constraint and the skew constraint are satisfied in all the divided regions.

13. The LSI design method according to claim 12, wherein a skew library, in which for each assumed size of the divided region, a relationship between a magnitude of a skew and a number of fan-outs is calculated in advance, is provided, wherein the third step calculates the skew for each of the divided regions based on the number of start points of the local tree, using the skew library.

14. The LSI design method according to claim 11, wherein a library, in which for each assumed size of the divided region, a relationship between a magnitude of a skew and a number of fan-outs is calculated in advance, is provided, the LSI design method further comprising using a computer to perform the steps of:

a seventh step for performing logic synthesis with respect to a high level description net list to generate a gate level net list;

an eighth step for performing floor planning based on the gate level net list;

a fifth step for counting, for each of the divided regions, a number of start points of the local tree included in the divided region;

a sixth step for determining whether or not the number of start points of the local tree calculated for each of the divided regions satisfies a predetermined fan-out constraint; and a ninth step for estimating a power consumption consumed by a clock tree, wherein the first step forms the local trees with a plurality of leaves included in the gate level net list as a target, the fifth step calculates, for each of the divided regions, the number of start points of the local tree included in the divided region with an assumption that for each of the divided regions the start points of the local tree are dispersed at a predetermined density, the third step calculates the skew using the library based on the number of the start points of the local tree that is calculated with the assumption that for each of the divided regions the start points of the local tree are dispersed at a predetermined density, the fifth step and the sixth step and/or the third step and the fourth step are carried out in the loop until the fan-out constraint and the skew constraint are satisfied in all the divided regions, and the ninth step calculates the number of stages of the high level clock tree, at a time when the fan-out constraint and the skew constraint are satisfied in all the regions divided in the loop, and based on the number of stages of the high level clock tree and on the number of the leaves included in the gate level net list, estimates a power consumption consumed by the clock tree.

15. The LSI design method according to claim 14, wherein the fifth step calculates, for each of the divided regions, the number of start points of the local tree included in the divided region with an assumption that for each of the divided regions the start points of the local trees are uniformly dispersed.

* * * * *